United States Patent
Stringer, III et al.

[11] Patent Number: 5,921,356
[45] Date of Patent: Jul. 13, 1999

[54] ADJUSTABLE PARKING BRAKE INTEGRATED WITH SERVICE BRAKE

[75] Inventors: Theodore H. Stringer, III, Southfield; Leonard Roy Elliott, Washington, both of Mich.

[73] Assignee: Meritor Heavy Vehicle Systems, L L C, Troy, Mich.

[21] Appl. No.: 08/728,236

[22] Filed: Oct. 8, 1996

[51] Int. Cl.⁶ .................................................. F16D 65/38
[52] U.S. Cl. ..................................... 188/196 D; 188/71.9
[58] Field of Search .............................. 188/196 D, 71.9, 188/196 V, 72.3, 170, 72.5, 106 F, 366, 72.4

[56] References Cited

U.S. PATENT DOCUMENTS

| | | | |
|---|---|---|---|
| 3,651,896 | 3/1972 | Fannin | 188/71.8 |
| 3,732,952 | 5/1973 | Asquith | 188/71.9 |
| 3,887,044 | 6/1975 | Burgdorf et al. | 188/73.5 |
| 4,351,422 | 9/1982 | Chauve | 188/170 |
| 4,540,066 | 9/1985 | Evans | 188/71.9 |
| 4,560,034 | 12/1985 | Windish et al. | 188/72.3 |
| 5,076,401 | 12/1991 | Ta et al. | 188/71.9 |

*Primary Examiner*—Robert J. Oberleitner
*Assistant Examiner*—Melanie Talavera

[57] ABSTRACT

An improved brake system includes a parking brake piston fixed to the backing plate of a brake friction material for a large vehicle. Service brake pistons are positioned about the parking brake piston. Both the service and parking brake may selectively actuate the brake. Upon actuation by the service brake piston, the parking brake piston moves with the backing plate. The parking brake is set by a parking brake actuator which is connected through a connector to the parking brake piston. When the service brake is set, it causes the connector to move with the parking brake piston. If adjustment is necessary, the connector will hit a stop, and adjustment of the connector along the parking brake piston will occur to compensate for wear on the friction material.

17 Claims, 4 Drawing Sheets

ADJUSTABLE PARKING BRAKE INTEGRATED WITH SERVICE BRAKE

BACKGROUND OF THE INVENTION

This Application relates to a piston actuated parking brake with is associated with service brakes, and wherein the parking brake is self adjusting.

Braking systems used for extremely large vehicles, such as large earth-moving vehicles, have typically included separate parking and service brake pistons. The service brake pistons are actuated by the operator to stop the vehicle. The parking brake locks the vehicle when parked. While these systems have been able to brake vehicles successfully, there are some deficiencies.

One deficiency relates to adjustment of the brakes due to wear on the friction material. The friction material contacts the vehicle rotor to retard rotation of the rotor, and thus stop the vehicle. With use, the friction material wears. As the friction material wears, the friction material becomes spaced further from the vehicle. The pistons move this friction material into contact. When wear occurs, it is necessary to move the pistons and friction material closer to the rotor such that the system compensates for the wear.

In the prior art systems, which used unconnected service and parking brake pistons, it was difficult to get corresponding adjustment between the service and parking pistons.

SUMMARY OF THE INVENTION

In the disclosed embodiment of this invention, a parking brake piston for a large vehicle includes a self-adjusting feature. In a preferred embodiment, the parking brake piston is fixed to a backing plate for the friction material. The service brake pistons contact and selectively move the backing plate towards a rotor to actuate a brake. The parking brake piston, which is fixed to the backing plate, also moves with the backing plate as it moves due to the service pistons. A self-adjusting connector is included adjacent the parking brake piston, and between the parking brake piston, and a parking brake actuator.

When the parking brake piston moves with the backing plate upon actuation by the service brake, the connecting member may be brought against a stop. If adjustment of the parking brake piston location is necessary, the connector contacts the stop prior to the end of movement of the parking brake piston. If this occurs, the parking brake piston will continue to move, and the connector will adjust its location on the parking brake piston. When the parking brake piston returns to its unactuated position, it will be spaced closer to the rotor. When the parking brake is again actuated, the connector is at its adjusted position, and thus able to provide adequate braking and holding strength on the friction material.

In preferred embodiments of this invention, the parking brake piston is received within a bore in the parking brake actuator. The connector is a frusto-conical member which includes inner-fitting incremental teeth that correspond to teeth on the outer periphery of the parking brake piston. The parking brake actuator bore has a frusto-conical surface that selectively engages the frusto-conical surface of the connector. The stop is fixed in the parking brake actuator bore. When the parking brake is actuated, the actuator, the connector and the parking brake piston all move towards the rotor under the force of a spring. When the parking brake is not actuated, a hydraulic pressure holds the parking brake actuator away from the rotor.

When the parking brake is held caged, but the service brake is actuated, the parking brake piston moves towards the rotor along with the connector. If there is no necessary adjustment of the parking brake piston, the connector will not contact the stop. However, if adjustment is necessary, the connector will contact the stop before engagement between the friction material and the rotor. Thus, the parking brake piston will continue to move towards the rotor. A force will be applied to the connector, and the connector will move incrementally along the parking brake piston to adjust the relative location of the parking brake piston and the rotor.

In a preferred embodiment of this invention, the connector has a split through its circumference. The split allows the connector to expand radially outwardly and allow the incremental teeth on the parking brake piston to move within the connector to provide the adjustment.

These and other features of the present invention will be best understood from the following specification and drawings, of which the following is a brief description.

DETAILED DESCRIPTION OF A PREFERRED EMBODIMENT

Figure 1:
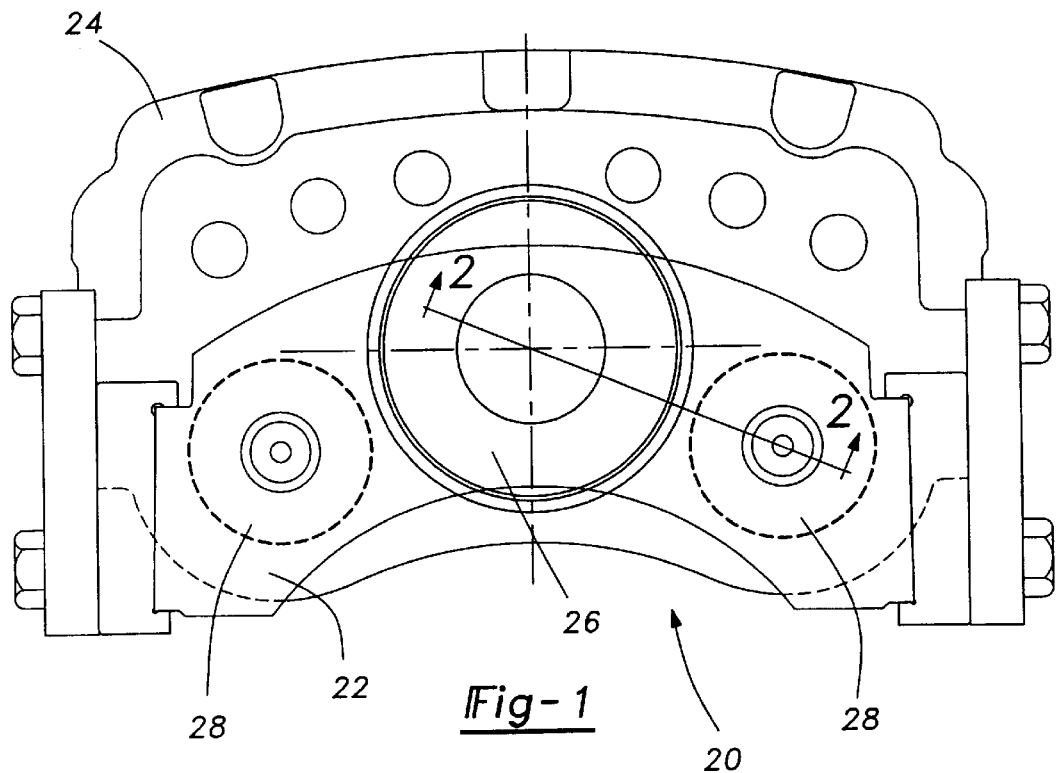
FIG. 1 is a schematic view of a braking system incorporating the present invention.

A braking system 20 which is particularly applicable to large vehicles is illustrated in FIG. 1. A backing plate 22 carries a friction material 24. A parking brake piston 26 is placed generally at a central portion of the brake 20. Service brake pistons 28 are placed on opposed sides of parking brake piston 26.

Figure 2:
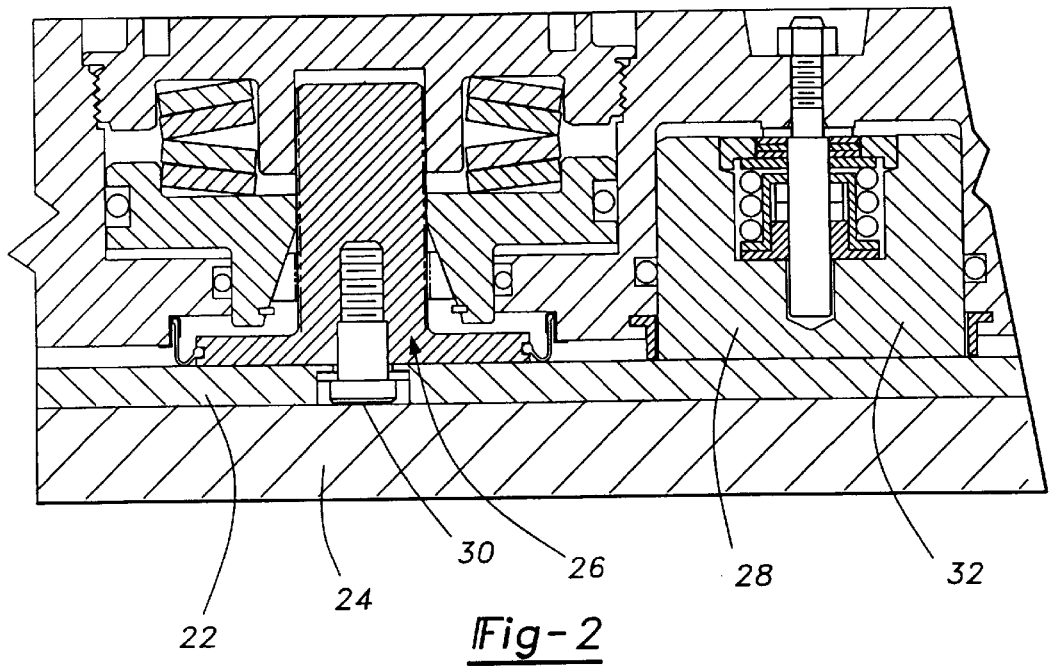
FIG. 2 is a cross-sectional view along line 2—2 of FIG. 1.

As shown in FIG. 2, parking brake piston 26 is fixed by bolt 30 to the backing plate 22. The service brake 28 is positioned outwardly of parking brake piston 26, and includes a piston 32 which abuts the backing plate 22. Thus, the backing plate 22 may move without corresponding movement of the service brake piston 32. An operator is given a control to selectively apply the brakes while moving the vehicle. The service brake piston 32 then moves against the backing plate 22 to bring the friction material 24 into contact with a rotor. When the service brake piston 32 does move the friction material, the parking brake piston will also move due to the connection of the bolt 30.

Figure 3A:
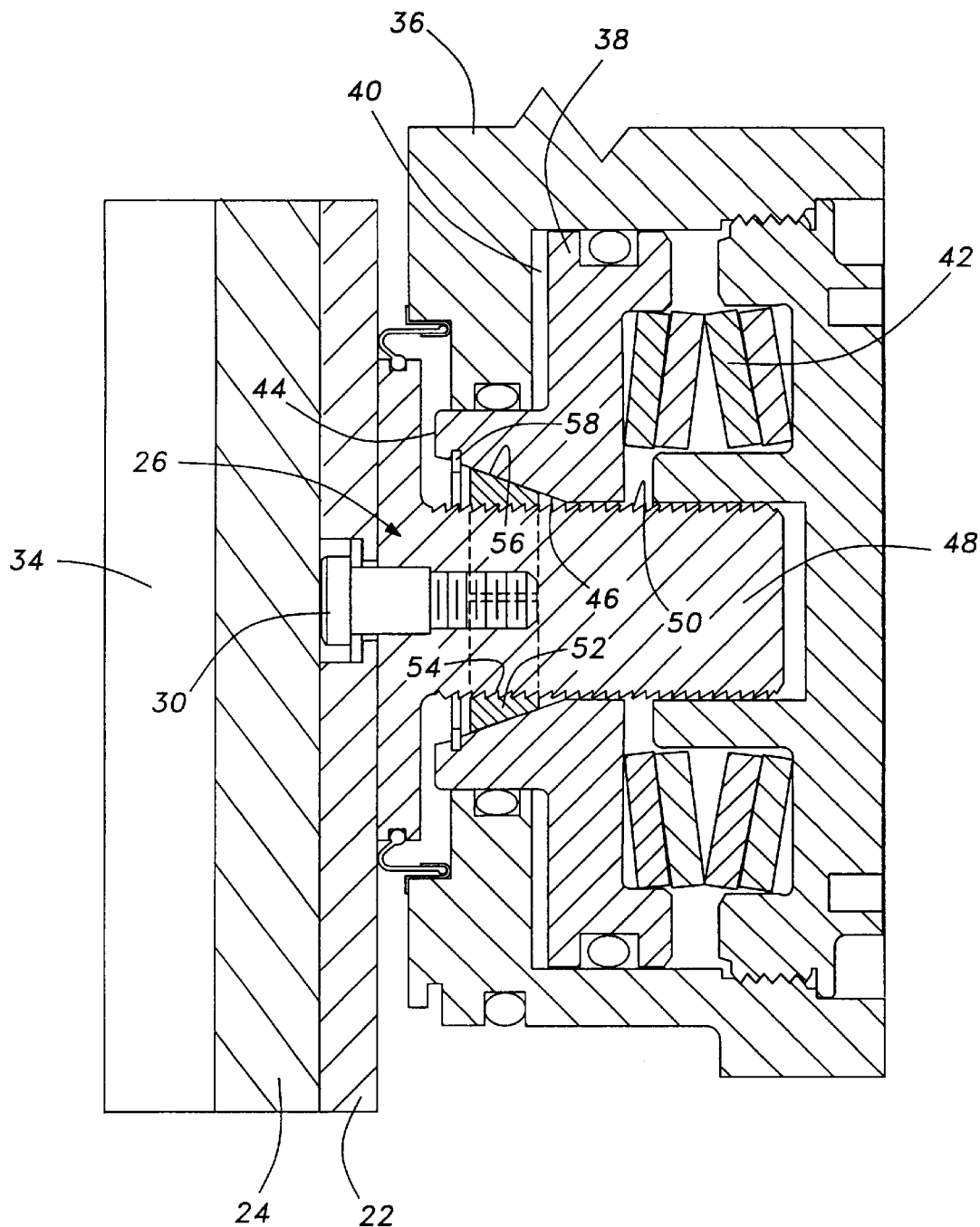
FIG. 3a is a cross-sectional view through a parking brake piston.

As shown in FIG. 3a, the rotor 34 is selectively contacted by friction material 24. An outer housing 36 surrounds the parking brake piston 26. A parking brake actuator 38 defines a hydraulic chamber 40 on one face, and receives a force from a Belleville spring washer pack 42 on another face. A source of fluid, not shown, communicates with chamber 40. The Belleville spring washer pack 42 tends to move the actuator 38 to the left as shown in FIG. 3a, to cause actuation of the brake. However, hydraulic fluid in chamber 40 holds the actuator 38 against the spring 42. In the position shown in FIG. 3a, the hydraulic pressure is relieved, and the spring has moved the actuator 38 to the left to cause the friction material 24 to contact the rotor 34.

A forward end 44 of actuator 38 is shown spaced from the parking brake piston 26. A frusto-conical inner bore 46 is formed on the actuator 38. Inner bore 46 expands in a direction toward the backing plate 22. The parking brake piston 26 has a rod 48 with incremental teeth 50 at its outer periphery. A connector 52 connects the parking brake piston 26 to actuator 38. To this end, the connector 52 includes incremental teeth 54 corresponding to the teeth 50 on the parking brake piston 26. The connector 52 also has a frusto-conical outer surface 56. A stop 58, which may be a snap ring, is received within inner bore 46. The parking brake piston is shown actuated in FIG. 3a. The spring 42 has moved the actuator 38 to the left. The inner bore 46 has contacted the connector 52 and caused it to move to the left. When connector 52 moves to the left, piston 26 moves to the left and backing plate 22 and friction material 34 move to contact the rotor 34.

As will be shown below, when the service brake is moved to actuate a brake, the parking brake piston 26 moves due to bolt 30. The connector 52 moves with the parking brake piston 26, however, the actuator 38 is still held by the pressure in chamber 40. There is an established clearance between the connector 52 and the stop 58, such that the connector can move through the stroke necessary for actuation of the service brake. With wear of the friction material, however, the backing plate 22 must move further to the left, and thus the connector 52 must also move further to the left. Eventually, the connector 52 will contact stop 58.

Figure 3B:
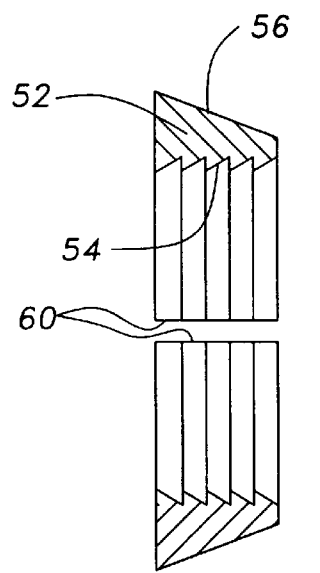
FIG. 3b is a cross-sectional view through the connector.
Figure 3C:
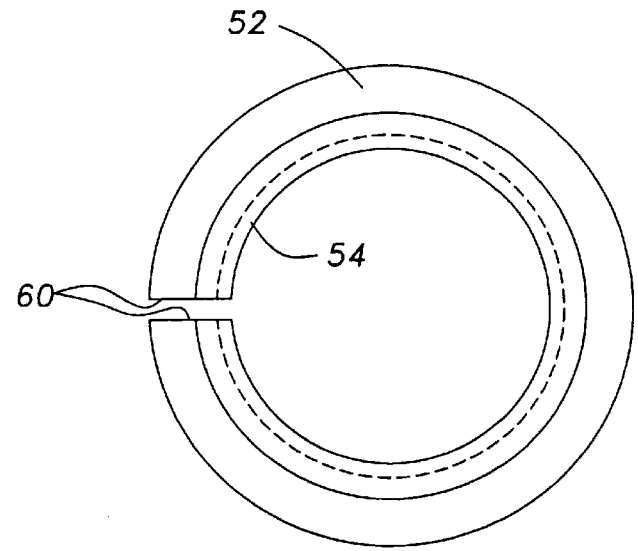
FIG. 3c is an end view of the connector shown in FIG. 3b.

As shown in FIGS. 3b and 3c, the connector 52 has the frusto-conical outer surface 56 with incremental inner teeth 54. Spaced ends 60 in the connector 52 define a slot. This slot allows radial expansion for adjustment of the connector 52 along the incremental teeth 50 at the outer periphery of parking brake piston 26, as will now be explained.

Figure 4:
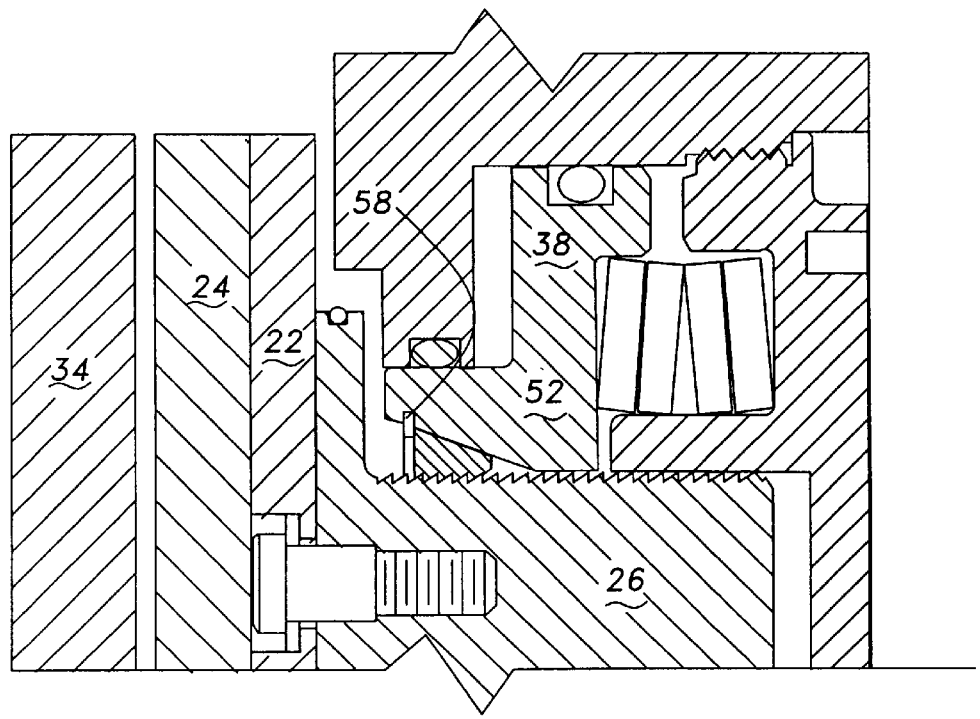
FIG. 4 shows the parking brake piston in a location providing adjustment.

FIG. 4 shows the position of the brake members with the service brake applied, and the parking brake not applied. The parking brake actuator 38 is held to the right as shown in this Figure. The connector 52 and the parking brake piston 26 have moved to the left. The friction material 24 is shown not yet contacting the rotor 34. Even so, the connector 52 now contacts the stop 58. The piston 32 (see FIG. 2) must move further to the left before there will be contact between the friction material 24 and the rotor 34.

During this further movement, the connector 52 is prevented from movement by stop 58. This causes the connector 52 to expand at the slot between the ends 60, and allow the parking brake piston 26 to move through the connector 52. When the force is relieved, the connector 52 will contract radially inwardly and its teeth will grip the teeth on the parking brake piston 26, however, connector 52 will then be at a position shifted to the right from that shown in FIG. 4. In this way, the position of the connector 52 on the parking brake piston 26 will be adjusted such that the beginning orientation of the various members compensates for wear on the friction material 24.

Figure 5:
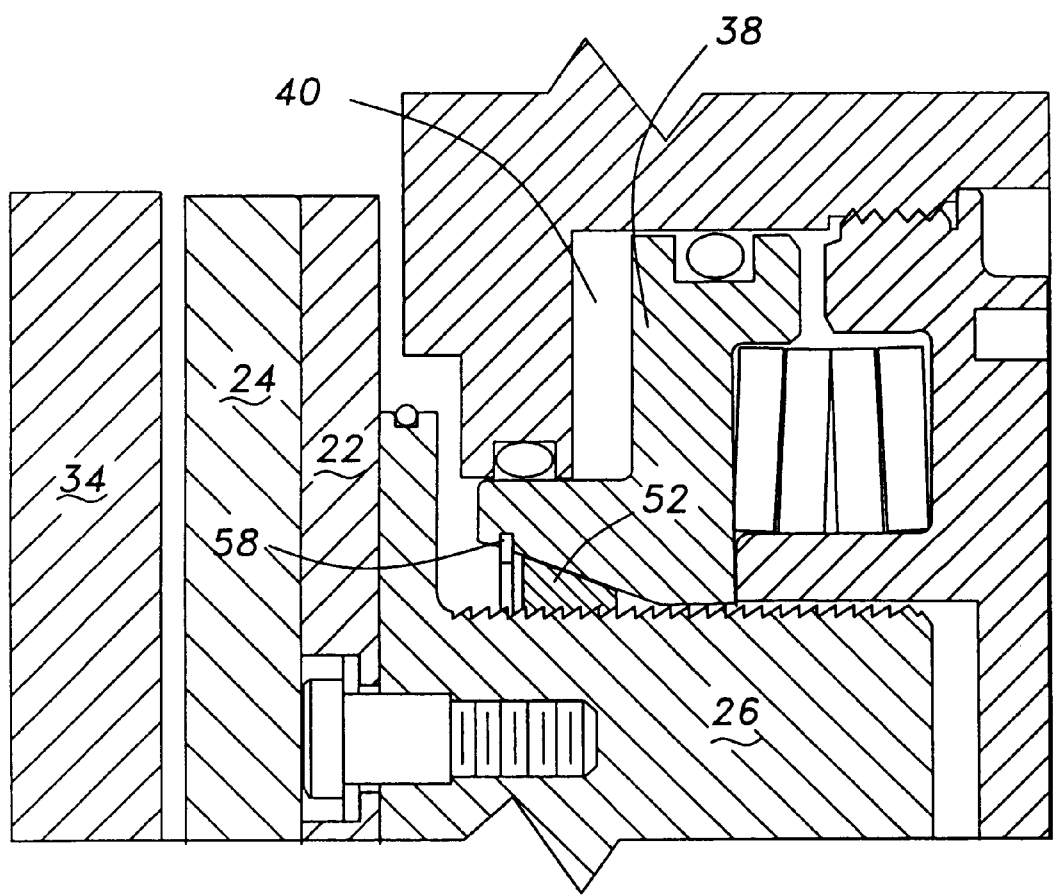
FIG. 5 shows the parking brake piston with the service brake applied.

As shown in FIG. 5, the parking brake piston 26 has returned to the unactuated position, and the service brakes have been released. The connector 52 has been moved to the right along the length of the parking brake piston. Now, when it is desired to set the parking brake piston, the hydraulic fluid is relieved from chamber 40, and the actuator 38 moves to the left. Since the connector 52 has been adjusted along the length of the parking brake piston 26, it need not move any undue amount, due to wear on the friction material 24.

The connector is preferably formed of a suitable metal, and most preferably.

A preferred embodiment of this invention has been disclosed, however, a worker of ordinary skill in the art would recognize that certain modifications will come within the scope of this invention. For that reason, the following claims should be studied to determine the true scope and content of this invention.

We claim:

1. A brake system comprising:
    a parking brake piston operably connected to an actuator, said actuator being biased in a first non-actuated direction by a fluid pressure, and biased towards an actuated position in opposition to the fluid pressure by a spring bias;
    a backing plate and friction material fixed to said parking brake piston; and
    structure allowing adjustment of the relative position of said actuator and said parking brake piston to compensate for wear on said friction material said adjustment structure including incremental teeth on an outer peripheral surface of a portion of said parking brake piston, and a connector selectively transmitting movement from said actuator to said parking brake piston, said connector having selectively mating incremental teeth, such that said teeth on said connector and said parking brake piston can move out of engagement to allow said parking brake piston to move relative to said actuator to provide said adjustment.

2. A brake system as recited in claim 1, wherein said connector includes a slot, allowing said connector to expand radially outwardly and allow movement of said parking brake piston within said connector to provide said adjustment.

3. A brake system as recited in claim 2, wherein said connector has a generally frusto-conical outer surface, said actuator having a corresponding frusto-conical inner bore for selectively contacting and moving said connector to actuate said parking brake.

4. A brake system as recited in claim 3, wherein said frusto-conical surfaces of said connector and said actuator expand radially outwardly in a direction toward said backing plate.

5. A brake system as recited in claim 3, wherein at least one service brake piston selectively contacts said backing plate to actuate a brake.

6. A brake system as recited in claim 5, wherein a stop extends radially inwardly from said frusto-conical inner bore of said brake actuator, said stop being contacted by said connector when said parking brake piston is moved by a service brake, to result in adjustment of said connector.

7. A brake system as recited in claim 1, wherein a service brake piston selectively moves said backing plate.

8. A brake system as recited in claim 7, wherein said parking brake piston is bolted to said backing piston, and said backing plate is capable of moving relative to said service brake piston.

9. A brake system comprising:
    a parking brake operably connected to an actuator, said actuator being biased in a first non-actuated direction by a fluid pressure, and biased towards an actuated position in opposition to the fluid pressure by a spring bias;
    a backing plate and friction material fixed to said parking brake piston; and structure allowing adjustment of the relative position of said actuator and said parking brake piston to compensate for wear on said friction material; and said adjustment structure includes a connector connecting said actuator to said parking brake piston, a stop contacting said connector member when said parking brake piston continues to move, said connector then adjusting its location on said parking brake piston to result in said adjustment.

10. A brake system as recited in claim 9, wherein said connector includes a slot allowing said connector to expand radially outwardly and allow said parking brake piston to move within said connector.

11. A brake system as recited in claim 10, wherein mating incremental teeth are formed on both said parking brake piston and said connector to facilitate adjustment.

12. A brake system comprising:

a friction material fixed to a backing plate;

a parking brake piston fixed to said backing plate;

at least one service brake piston, said service brake piston being selectively moved into and out of contact with said backing plate to cause said backing plate and said friction material to move to a braking position; and the relative location of a parking brake actuator and said parking brake piston is adjustable, said adjustment structure includes a connector connecting said actuator to said parking brake piston, a stop contacting said connector member when said parking brake piston continues to move, said connector then adjusting its location on said parking brake piston to result in said adjustment.

13. A brake system as recited in claim 12, wherein said adjustment structure includes a connector connecting said actuator to said parking brake piston, a stop contacting said connector member when said parking brake piston may still be moving, said connector then adjusting its location on said parking brake piston to result in said adjustment.

14. A brake system as recited in claim 12, wherein said connector includes a slot allowing said connector to expand radially outwardly and allow said parking brake piston to move within said connector.

15. A brake system as recited in claim 14, wherein mating incremental teeth are formed on both said parking brake system and said connector to facilitate adjustment.

16. A brake system as recited in claim 12, wherein said parking brake piston is bolted to said backing plate, and said backing plate is capable of moving relative to said service brake piston.

17. A brake system comprising:

a parking brake operably connected to an actuator, said actuator being biased in a first non-actuated direction by a fluid pressure, and being biased towards an actuated position in opposition to the fluid pressure by a spring bias;

a backing plate and friction material fixed to said parking brake piston;

structure allowing adjustment of the relative position of said actuator and said parking brake piston to compensate for wear on said friction material, said structure including teeth on said actuator and said parking brake piston, said teeth being able to move out of contact to allow said adjustment, and said teeth then moving back into contact to hold said parking brake at a position relative to said actuator; and at least one service brake piston, said service brake piston being selectively moved into and out of contact with said backing plate to cause said backing plate and said friction material to move to a braking position.

* * * * *